US005557711A

United States Patent [19]

Malzbender

[11] Patent Number: 5,557,711
[45] Date of Patent: Sep. 17, 1996

[54] APPARATUS AND METHOD FOR VOLUME RENDERING

[75] Inventor: Thomas Malzbender, Mountain View, Calif.

[73] Assignee: Hewlett-Packard Company, Palo Alto, Calif.

[21] Appl. No.: 512,847

[22] Filed: Aug. 9, 1995

Related U.S. Application Data

[63] Continuation of Ser. No. 599,326, Oct. 17, 1990, abandoned.
[51] Int. Cl.$^6$ .................................................. G06F 15/00
[52] U.S. Cl. ......................... 395/122; 395/124; 395/131
[58] Field of Search ................................. 395/124, 126, 395/127, 131, 163, 164, 124, 125, 126, 129, 130, 131, 132, 163, 164, 119, 121, 122

[56] References Cited

U.S. PATENT DOCUMENTS

| | | | |
|---|---|---|---|
| 5,101,475 | 3/1992 | Kaufman et al. | 395/124 |
| 5,113,357 | 5/1992 | Johnson et al. | 395/124 |

OTHER PUBLICATIONS

Dunne et al., "Fast Reprojection of vol. Data"; pp. 11–18; IEEE 1990.
Levoy, Marc, "Display of Surfaces from vol. Data", IEEE 1988, pp. 29–37.
Fuchs, Henry et al., "A Heterogeneous Multiprocessor Graphics System using Processor Enhanced Memories", 1989, pp. 1–22.
Kaufman, Arie, "The Cube Workstation —A 3D Voxel–based Graphics Environment", 1988, pp. 4:210–221.
Goldwasser, Sam, "The Voxel Architecture for Realtime Display and Manipulation of 3D Medical Objects", 1985, pp. 71–80.

Primary Examiner—Mark R. Powell
Assistant Examiner—Huynh Ba

[57] ABSTRACT

An apparatus and method adapted for performing volume rendering is disclosed in which the object space is divided between a plurality of processing units. Each processing unit generates a view of the data which is restricted to a portion of the object space. The view so generated are then combined a plurality of compositing processors to form the view of the object.

12 Claims, 3 Drawing Sheets

APPARATUS AND METHOD FOR VOLUME RENDERING

CROSS REFERENCE TO RELATED APPLICATION

This is a continuation of application Ser. No. 07/599,326 filed on Oct. 17, 1990 abandoned.

FIELD OF THE INVENTION

The present invention relates to computer image generation, and more particularly, to methods for generating images based on three-dimensional dam.

BACKGROUND OF THE INVENTION

Many measurement techniques produce data representing the variation of some physical property over a three-dimensional volume. For example, magnetic imaging techniques used in medical imaging generate data representing the density and environment of hydrogen nuclei at various locations in the subject's body. Similarly, CAT scans measure the x-ray absorbance at various locations in the subject's body. All of these techniques generate three-dimensional arrays of data in which each point in the array represents the measured physical property at a corresponding point in the object under examination.

Presenting the large amount of data generated by such imaging techniques in a manner that is easily assimilated by human observers presents significant computational problems. The process of convening three-dimensional arrays of data to images representing that data is referred to as volume rendering. Several approaches to this problem have been implemented. In general, these approaches assign "optical" properties to each point in a three-dimensional volume which is broken into small volumes referred to as vowels. Ideally, an image is then produced by calculating the image one would see on a screen located between the object and the viewer if a three-dimensional object having these optical properties were viewed from a given location when the object is illuminated. Unfortunately, the computational difficulty inherent in taking into account reflections, absorption, and scattering in each voxel are too great to allow an exact computation to be made. Hence, various approximations to the exact computation are utilized.

One general approach which is computationally manageable is referred to as ray casting. This approach assigns color and opacity values to each voxel. A ray is generated corresponding to each pixel on the viewing screen. As the ray passes through the various voxels, color values are integrated along the ray path. The resultant calculated value is essentially equivalent to the light reaching the screen along the ray that would be generated if each voxel consisted of a material which generated light of the color in question and absorbed light according to the assigned opacity value. High opacity values at a particular voxel will cause a strong color contribution from that voxel as well as attenuating color values generated by voxels behind the voxel in question. The contributions of secondary rays produced by reflections and refractions in other voxels are ignored in this approximation.

While this type of volume rendering generates useful images, the computational workload is prohibitive if the three-dimensional data array is large. As the resolution of the measuring devices increases, the size of the three-dimensional data arrays in question increase dramatically. An improvement of a factor of two in resolution results in a factor of eight increase in the size of the three-dimensional data array and a similar increase in the computational workload.

On conventional sequential computers, the time to calculate a single view of the data may be several hours. Such long computational times severely limit the usefulness of such imaging techniques. In general, the viewer must examine several such images to find the view point that best displays the features of the data which are of interest. Hence, interactive systems in which the user can move his or her viewpoint relative to the "object" are advantageous. To provide such interactive displays, parallel computer computation is necessary.

In parallel computing systems, the computations are divided between a number of processors. Each processor is responsible for computing a portion of the image. Ideally, N processors should be able to produce an image in $1/N^{th}$ the time needed for a single processor to generate the image. However, in practice, such improvements are seldom realized.

In prior art systems, the three-dimensional data array is stored in a memory which is accessed by each of the processors. The number of processors that can share the memory is limited by the bandwidth of the communication path connecting the memory to the processors. This path is shared by the various processors. Hence, there is a limit to the number of processors that can effectively operate on the data array. This limit is independent of the size of the memory array. Hence, as the size of the array increases with improvements in resolution of the measuring instruments, the gains obtained from parallel processing are reduced.

A second problem with this prior art approach is the complexity of the individual processors. Even if the effective memory bandwidth is increased, the cost of providing a large number of general purpose processors becomes a limiting factor in constructing an economically feasible system. Hence, an imaging system in which a substantial fraction of the computations can be performed by small special purpose processors is highly desirable.

Broadly, it is an object of the present invention to provide an improved imaging method and apparatus for performing volume rendering.

It is a further object of the present invention to provide an imaging method and apparatus which is not limited by the bandwidth of the memory in which the three-dimensional data array is stored.

It is yet another object of the present invention to provide an imaging method and apparatus which utilizes small inexpensive processors for a substantial portion of the computations.

These and other objects of the present invention will become apparent to those skilled in the art from the following detailed description of the present invention and the accompanying drawings.

SUMMARY OF THE INVENTION

The present invention comprising a multiprocessing system for generating a view of a three-dimensional data array comprises values associated with a three-dimensional object space. The apparatus includes two types of processors. Given a ray traversing the object space, first type of processor performs initial computations which produce signals representing the transparency and luminescence of each of a plurality of regions in the object space. The second class of processors, referred to as compositers, combine the transparency and luminescence signals generated by the first class of processors to generate transparency and luminescence for the object space as whole along the ray in question. Each processor of the first type is assigned a region of the object space. Each processor preferably stores the portion of the three-dimensional data array needed to compute transparency and luminescence signals in the region assigned to that processor. Each compositer generates a combined transparency and luminescence signals from those produced by two other processors, either compositers or processors of the first type. The combined signals are those that would have been generated by a processor of the first type for the ray in question if said processor had been assigned a region of the object space comprising the region occupied by the regions of all of the processors of the first type that are connected to said compositer either directly or through other compositers.

DETAILED DESCRIPTION OF THE INVENTION

The present invention obtains its advantages through three improvements over the prior art. First, the three-dimensional data array is divided between a plurality of processors in a manner which avoids the memory bandwidth limitations discussed above. Each processor calculates color and opacity values related to a particular subset of the three-dimensional data array. Since this calculation only requires information regarding the subset of the three-dimensional data array under the processor's control, access to the entire three-dimensional data array is not required. Hence, the memory access problems encountered in the prior an are avoided.

Second, the color and opacity values computed for adjacent regions are combined in a hierarchical manner that also avoids memory access problems. The color and opacity values computed for each pair of adjacent regions are combined to form new color and opacity values. The new values are those that would have resulted from a region whose volume consists of the the volumes contained in the two volumes that were combined. The process of combining two volumes in this manner will be referred to as compositing in the following discussion.

At each stage in the compositing operation, the number of regions is reduced by a factor of two. At the initial stage, the effective color and opacity values for each of the regions are calculated. These are then combined to provide a set of values which describe a region which is twice as large as the original region. These new values are then composited to form values describing a region which is again twice as large, i.e., four times the size of the original regions. The process is continued until values describing the entire volume are generated. The color value of this last region represents the color for the ray in question.

The third improvement provided by the present invention lies in the use of special purpose compositing circuits for performing the compositing operation. Each of these circuits can be produced at a cost which is significantly less that that of a general purpose processor. Hence, a significant fraction of the computations can be performed on low cost hardware.

The manner in which the present invention operates may be more easily understood with reference to the manner in which ray casting is normally practiced to provide a two-dimensional image representing a view of a three-dimensional data array. For the purposes of this discussion, it will be assumed that the three-dimensional data array comprises a set of values which are associated with a regular grid defined by triplet of coordinate values. If the three-dimensional data is not so measured, the data set on such a regular grid may be obtained by interpolation.

Figure 1:
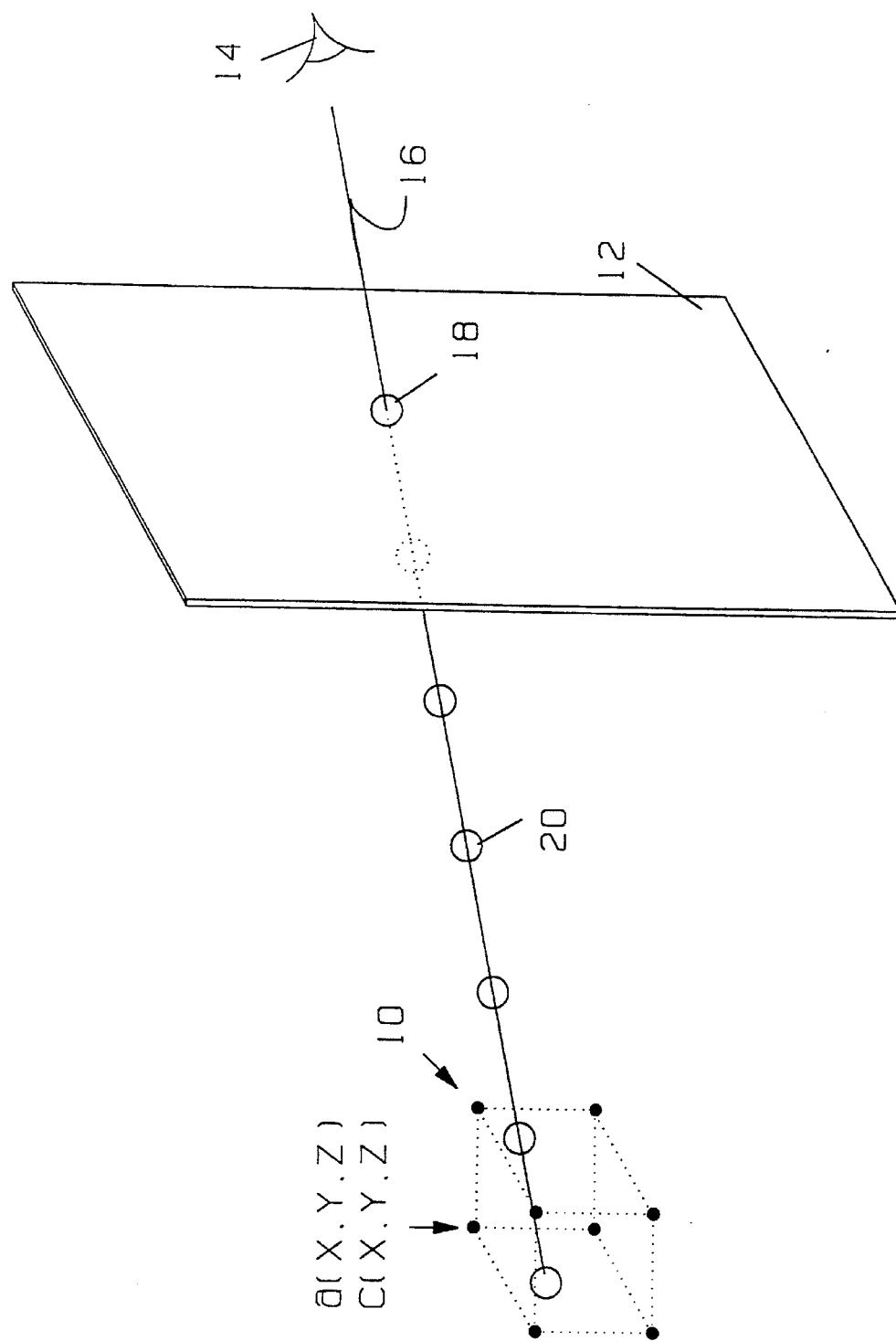
FIG. 1 illustrates the manner in which the rays are defined.

The ray casting operation consists of defining a plurality of rays from the viewer through the space in which the three-dimensional data array is located and resampling the $C(x,y,z)$ and $a(x,y,z)$ data along each of these rays to arrive at values to be displayed on a screen or similar two-dimensional display device. FIG. 1 illustrates the manner in which the rays are defined and the manner in which the re,sampling operation is carded out. A coordinate system is defined in the space. A portion of the three-dimensional data array is shown at 10. A value from the three-dimensional data array is associated with each grid point x,y,z. For each point in the array, values of $C(x,y,z)$ and $a(x,y,z)$ are stored.

Each ray is defined by extending a line from the viewer 14 through a corresponding pixel on the view screen 12. There is one such ray for each pixel on the view screen. An exemplary ray 16 is shown passing through pixel 18. The ray passes through the space in which the three-dimensional data array is defined. A plurality of equidistant points 20 are defined along the array. These points are numbered starting with the point furthest from the screen, the last point being the pixel 18 screen 12.

For each point on the ray, a value is calculated for $C(x,y,z)$ and $a(x,y,z)$ by interpolating the nearest 8 points in the three-dimensional data array. The values obtained for the $i^{th}$ point on the ray will be referred to as $C_i$ and $a_i$. $C_i$ and $a_i$ represent the color and opacity of the voxel at the $i^{th}$ point. For each point on the ray, a second value, denoted by $^iC_{out}$ for the $i^{th}$ point, is also calculated from the relationship:

$$^iC_{out} = {}^{i-1}C_{out}*(1-a)+C_i*a_i \tag{1}$$

where $^0C_{out}$ is defined to be 0. $^iC_{out}$ represents the light leaving the $i^{th}$ point The first term in Eq. (1) represents the attenuation of the light entering the $i^{th}$ point. The light entering the point is that which left the previous point. The second term in Eq. (1) corresponds to the emission of light from the $i^{th}$ point. Hence, this display model simulates a translucent material having absorption. To simplify the following discussion, Eq. (1) will be written in a form more corresponding to these properties, namely, $$^iC_{out} = {}^{i-1}C_{out}*T_i+S_i \tag{2}$$

Here, $T_i=1-a_i$ and $S_i=C_i*a_i$. $T_i$ is analogous to a transparency value for the $i^{th}$ point and $S_i$ is analogous to the fight supplied by $i^{th}$ point. The T and S values are the values actually stored in the preferred embodiment of the present invention.

If the ray point coinciding with the screen is point N, then the value to be displayed on the screen for the pixel in question is $^NC_{out}$.

One such ray must be calculated for each pixel on the view screen. As noted above, the computational workload here is too great for a single processor to provide a view in a time consistent with real-time viewing. Hence, multiprocessor systems must be utilized.

In the prior art, the various ray calculations are divided among a set of processors. Each processor is assigned the task of calculating the rays through some predetermined set of pixels on the viewing screen. As pointed out above, there is a limit to the number of processors that can be effectively utilized in such an arrangement. In general, the three-dimensional data array is too large to be copied to each processor; hence, a single data array is shared by all of the processors. Each processor must have access to the entire three-dimensional data array, since the viewer's position changes from view to view. As a result, a bottleneck arises at the memory interface connecting the processors to the computer memory in which the three-dimensional data array is stored.

The present invention avoids this bottleneck by distributing the data array between a plurality of processors. In the present invention, each processor may contribute data to the display at any given pixel. Hence, data from each of the processors must be combined to provide a display. The present invention provides an efficient method and apparatus for combining these contributions which avoids bottlenecks and, in addition, allows the a significant fraction of the computational workload to be carried out by inexpensive special purpose hardware.

The results of a ray traversing a region of the object space can be written in the form of Eq. (2). That is, one may define overall T and S values such that $$C_{out}=C_{in}* T+S \quad (3)$$

Here, $C_{in}$ is the color entering the region and $C_{out}$ is the color leaving the region. Eq. (6) is applied for each of the three primary colors. If there are N points on the ray path through the region in question, then it may be shown that $$S=\Sigma_i^N[C_i*a_i*\pi_{j=i+1}^N(1-a_j)] \quad (4)$$

and $$T=\pi_{j=1}^N(1-a_j) \quad (5)$$

Eq. (4) is applied for each color. That is, the equivalent red output of the region is given by $$R=\Sigma_i^N[R_i*a_i*\pi_{j=i+1}^N(1-a_j)] \quad (6)$$

where $R_i$ is interpolated value for the red component of $C_i$, and so on. Similar equations apply for the blue and green components. In the following discussion, the T value calculated for a given ray through a given region of the object space will be referred to as the transparency of the region in question to the ray in question. Similarly, the S value will be referred to as the luminescence of the region for the ray in question.

Figure 2:
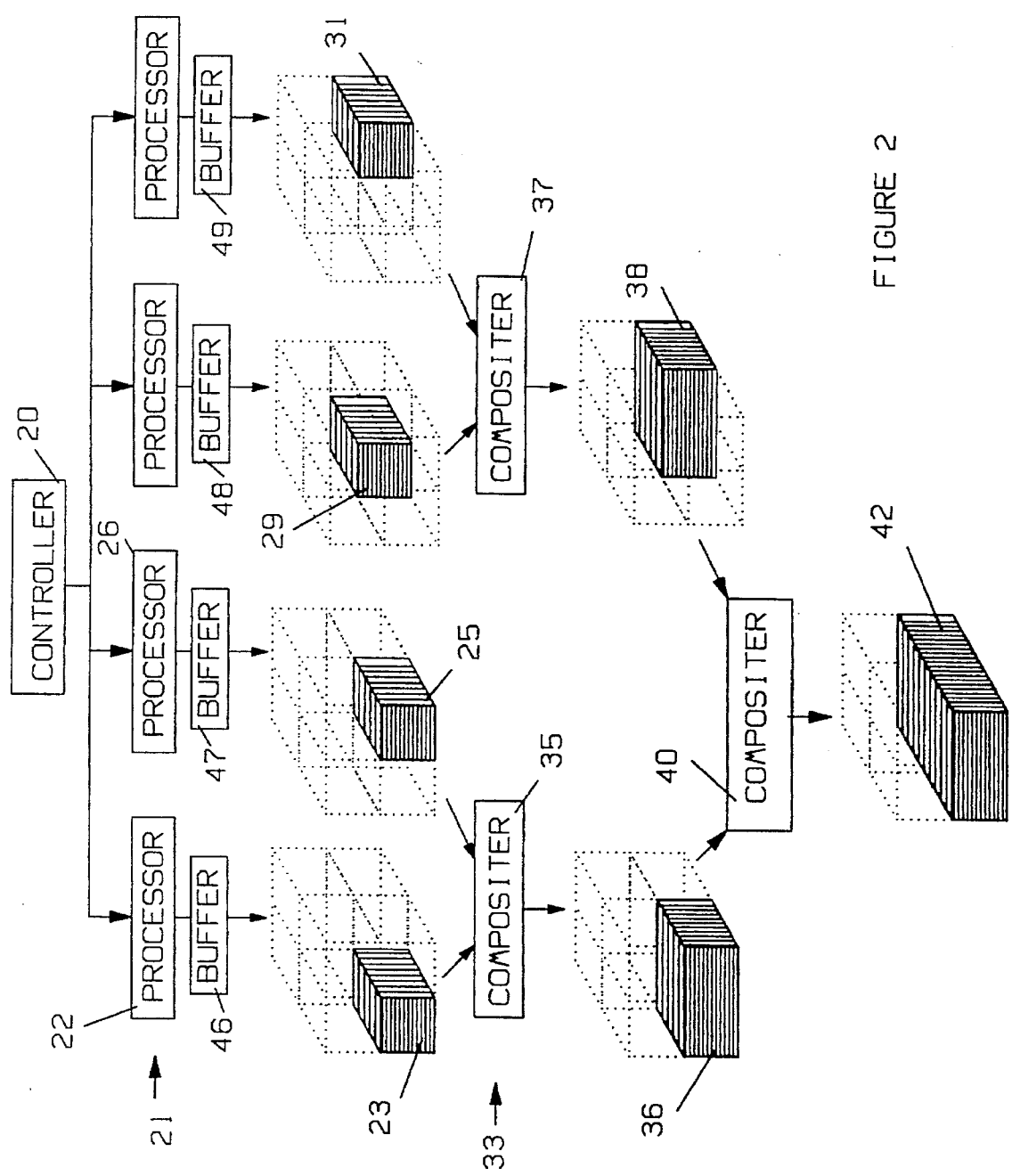
FIG. 2 illustrates the manner in which one embodiment of an apparatus according to the present invention calculates the value to be displayed on a particular pixel of the display screen.

FIG. 2 illustrates the manner in which one embodiment of an apparatus according to the present invention calculates the value to be displayed on a particular pixel of the display screen. An apparatus according to the present invention utilizes two types of processors under the control of a controller 20. The first class of processors are general purpose digital processors. These processors are shown at 21. These processors will be referred to as the first level processors. Each of the first level processors stores the portion of the three-dimensional dam array that is needed to calculate the S and T values describing the volume under its control. Hence, processor 22 generates the S and T values that describe region 23. Processor 26 generates the S and T values that describe region 25, and so on.

To perform these calculations, the first level processors receive the information defining the ray passing through the pixel currently being calculated. This information is broadcast to all the first level processors by controller 20.

When the results from the first level processors are available, they are combined one pixel at a time in a hierarchical manner by a second class of processors which will be referred to as compositers. Each compositer accepts the output of two processors in the level above said compositers in the hierarchy. The compositers in the first level of compositers, shown at 33, receive their inputs from the first level processors. Compositer in the second and subsequent levels of compositers, such as compositer 40, receive their input from the compositers in the previous level. The output of the lowest level compositer is the color value to displayed for the ray in question.

Each compositer computes the S and T values for each ray that describe the region of the object space comprising the sum of the regions described by the processors from which it receives its inputs. Hence, compositer 35 computes the S and T values that describe region 36. The S output is the value that would be displayed for the ray in question on the view screen if the object space consisted only of the data in region 36. Region 36 is the region obtained by combining regions 23 and 25, the S and T values for these regions having been computed by processors 22 and 26, respectively. Compositer 37 computes the S and T values that describe region 38 which is the sum of regions 29 and 31. Similarly, compositer 40 computes the S and T values that describe region 42 which is the sum of regions 36 and 38. The final compositer in the hierarchy computes the S and T values that describe the entire object space. This last S value is the value displayed for the ray in question. To simplify FIG. 2, this compositer has been omitted.

While the above description assumes the existence of a separate controller, it will be apparent to those skilled in the art that one of the first level processors may carry out the functions of the controller.

Having provided this overview of the operation of the present invention, a more detailed discussion of the method and apparatus will now be given. For the purposes of this discussion, it will be assumed that controller 20 is a general purpose computer with conventional storage systems and user interfaces. Further it will be assumed that the three-dimensional data array is stored in controller 20 prior to display.

A three-dimensional data array is a list of numbers $D_{i,j,k}$ in which each number is identified by a label having 3 numbers (i,j,k). The present invention generates a display of a three-dimensional object located in a predetermined region of space which will be referred to as the object space in the following discussion. The display simulates the scene a viewer would see from a particular location in the object space if the viewer viewed the object through a "window" that coincides with the screen of the user's video display terminal. Hence, before the present invention may be utilized to display the three-dimensional data array, (x,y,z) spatial coordinates in the object space must be assigned to each label value (i,j,k). One method for accomplishing this is to define each coordinate by a linear transformation of the corresponding index value. That is, the x coordinate corresponding to index value (i,j,k) is $i*dx+O_x$ where dx and $O_x$ are constants.

Once the coordinates have been assigned, the object space is divided into regions. One such region is preferably provided for each first level processor 21 shown in FIG. 2. However, it will be apparent to one of ordinary skill in the art, that a single processor could be used to simulate two or more first level processors without deviating from the teachings of the present invention. Similarly, more than one processor can be assigned to each region. Each first level processor 21 includes a local memory which is used to store a portion of the three-dimensional data array.

The three-dimensional data array is a vector valued array. That is, there are several values associated with each label (i,j,k). In the preferred embodiment of the present invention, there are three color values and one opacity value associated with each label. However, embodiments with different numbers of values will be apparent to those skilled in the art. For example, a monochromatic system would require only two values for each point. Similarly, more complex color rendering systems could utilize different opacities for the different colors. It will also be apparent to those skilled in the art that the teachings of the present invention may be applied to systems in which parameters other than color and opacity are stored in the three-dimensional array.

The portion of the three-dimensional data array that is needed to calculate color and opacity values at any location within the region of the object space assigned to a given first level processor is stored in that processor. In the preferred embodiment of the present invention, the first level processors utilize linear interpolation to calculate color and opacity values. In this case, the portion of the three-dimensional data army needed will include all array values corresponding to the coordinates within the region in question and on the boundary thereof. It will be apparent to those skilled in the art that some array values corresponding to points in neighboring regions may also be needed if higher order interpolation methods are used.

In the preferred embodiment of the present invention, controller 20 assigns the spatial coordinates and distributes the appropriate subsets of the three-dimensional data array to the first level processors.

The coordinates of the view point and viewplane are determined by controller 20 and passed on to each first level processor. This defines a set of rays in which one ray corresponds to each pixel in the viewplane. Each processor can divide these rays into two types, those that pass through the region of the object space assigned to the processor in question and those that do not. For those that do not pass through the region, default transparency and color values are assigned. For each ray that does pass through the processor's region of the object space, an ordered set of equally spaced points along this path is defined, the first point being the one furthest from the view screen and labeled as point 1, the last point being closest to the view screen and labeled N.

The three color values and opacity value at each point on the path are then calculated by linearly interpolating the three-dimensional data array. From this data Eqs. (4) and (5) can then be used to produce a T and three S values corresponding to the primary colors. These S values will be denoted by R, B, and G. Each of the three values is obtained by substituting the color intensity for the color in question into Eq. (4) in place of $C_i$. The output of the first level processors for each ray comprises the values of R, G, B, and T calculated from the path associated with said array.

Each first level processor works it way through the list of rays in a predetermined order storing the results of its calculations in the memory associated with that processor. Each first level processor places its S and T values into one half of a local frame buffer. Local frame buffers are shown at 46–49. There is one such buffer included in each first level processor. The two halves of the frame buffer will be referred to as buffers A and B in the following discussion. At any given time, one half of the frame buffer is connected to the processor and is used for storing S and T values as said values are generated. The other half of the frame buffer contains the S and T values calculated previously. For the purposes of this discussion, it will be assumed that the first level processors are currently storing their results in buffer A, and buffer B is connected to the compositors associated with the first level processor in question. As each first level processor completes the S and T calculations for all of the rays in its current list, the processor transmits a completion signal to controller 20. When controller 20 has received completion signals from all first level processors, controller 20 transmits a signal to the compositors indicating that compositing may begin. Each first level processor then switches to buffer B and begins calculating S and T values for the next image. Meanwhile, the compositors read values from buffer A.

Alternatively, a single ray value could be composited immediately after it is computed by a first level processor. Upon completion of the calculations associated with that ray, the outputs of the various first level processors would be combined by the compositors and sent to the controller 20 for display. While this embodiment of the present invention is conceptually simpler and requires less memory in each of the first level processors than the preferred embodiment, it is less efficient, and hence, not preferred.

In general, any given ray will only pass through a sub-set of the regions in the object space. Whether or not a specific ray passes through a specific region can be ascertained in a small fraction of the computational time needed to actually calculate the output for a region through which the ray passes. This is the first operation done by each first level processor in defining the path of the ray through its region of the object space. Hence, if the results for each ray are completed before the next ray is assigned, most of the first level processors will determine that their region of the object space is not needed. These first level processors will be idled until the computations are completed in the first level processors whose regions are involved. The time needed to compute a single view will be approximately proportional to the number of rays times the time needed for a single first level processor to compute the output for the longest path through its region.

If, on the other hand, each first level processor receives a list of all of the rays to be calculated, it can use the above mentioned idle time to calculate its output for the next ray in the list. In this case, the time needed to compute a single view will be approximately proportional to the number of rays times the average time needed for a first level processor to compute its output.

The manner in which the compositers operate will now be explained in more detail. As noted above, the results of a ray traversing a region of the object space can be written in the form of Eq. (3). A compositer computes the S and T values that would be obtained if the ray passed through two regions of the object space for which S and T values are already known. For the purposes of this discussion, the S and T values corresponding to the first region will be denoted by S(1) and T(1), and those for the second region by S(2) and T(2). It will be assumed that the first region is the region farthest from the view screen. The compositer computes S(3) and T(3) which correspond to the S and T values that would have been generated by applying eqs (4) and (5) to the portions of the ray passing through the first and second regions. It can be shown that $$S(3)=S(2)+T(2)*S(1) \quad (7)$$

and $$T(3)=T(1)*T(2) \tag{8}$$

In applying Eq. (7), it should be remembered that S represents any of the separate color signals R, B, or G.

The above analysis requires a knowledge of which region is closest to the view screen. This information is available from a knowledge of the ray and the manner in which the object space has been divided among the first level processors. In the preferred embodiment of the present invention, controller 20 provides this information to each of the compositers. The connections between controller 20 and the compositers have been omitted from FIG. 2 to simplify the drawing.

Figure 3:
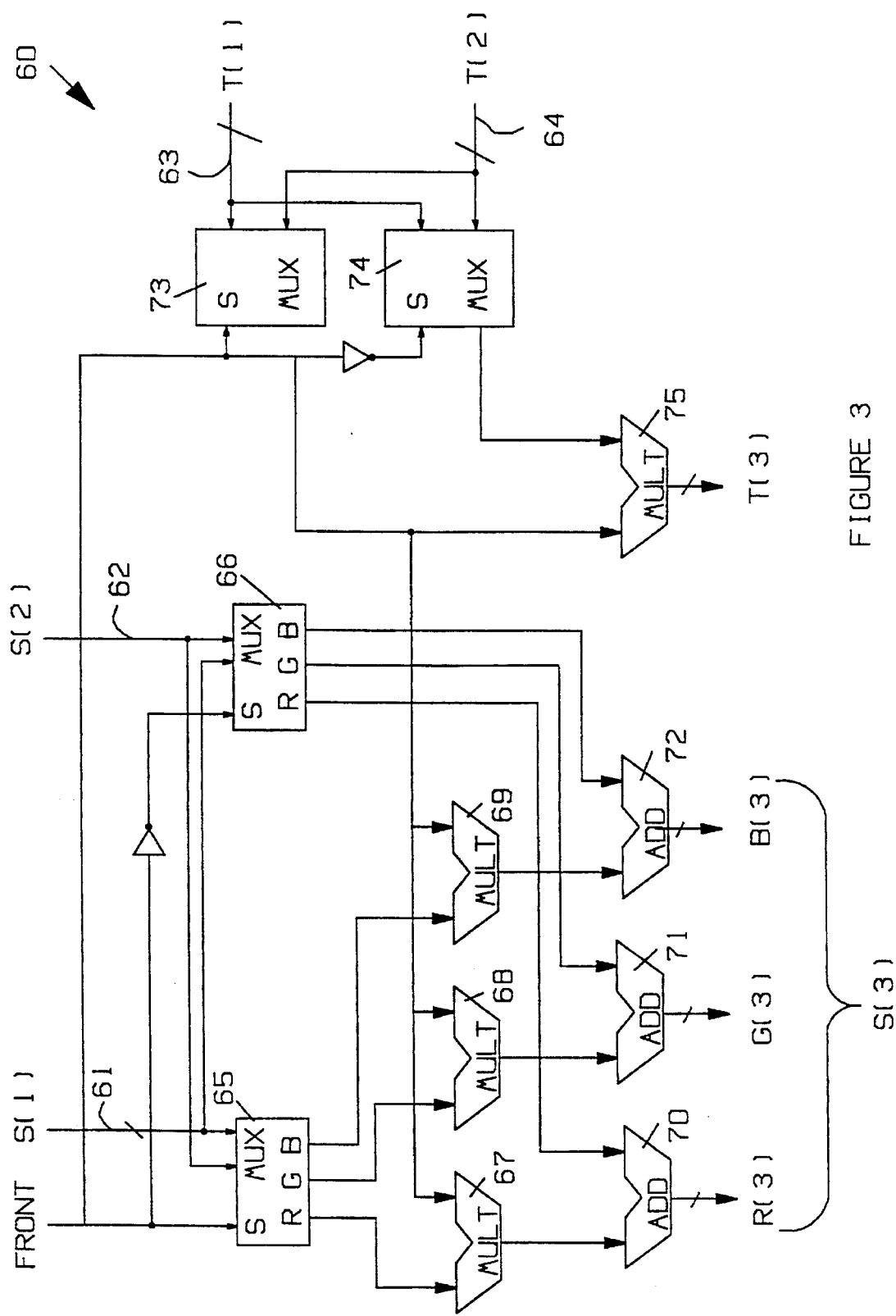
FIG. 3 is a block diagram of a compositer according to the present invention.

An exemplary embodiment of a compositer according to the present invention is shown in FIG. 3 at 60. Compositer 60 receives two S values, S(1) and S(2), on buses 61 and 62 respectively. Each of the S values comprises three digital signals specifying the R, G, and B components. Compositer 60 also receives two T values, T(1) and T(2), on buses 63 and 64 respectively. The inputted S and T values are provided by the processors above compositer 60 in the hierarchy. Compositer 60 also receives a signal, FRONT, from controller 20 which defines which of the two signals comes from the region closest to the view screen. The FRONT signal controls multiplexers 65 and 66 which determine which of the two sets of S values is applied to the multipliers shown at 67–69. The remaining set of S values are applied to the adders shown at 70–72. The FRONT signal also controls multiplexers 73 and 74 which determine which of the T signals is used by multipliers 67–69. The outputs of adders 70–72 comprise the composite S signals, $S(3)$. The output of multiplier 75 comprises the new T signal, T(3).

There has been described herein a novel method and apparatus for generating a view of a three-dimensional data array. Various modifications to the present invention will become apparent to those skilled in the art from the foregoing description and accompanying drawings. Accordingly, the present invention is to be limited solely by the scope of the following claims.

What is claimed is:

1. In a computer system having a processing subsystem, a memory, and a display for displaying an image in a two-dimensional array of pixels, a method for generating a pixel luminescence value to be displayed in a subset of said array of pixels as part of a two-dimensional view of a three-dimensional image, the three-dimensional image being stored in the computer memory as a three-dimensional data array comprising object data values associated with a plurality of sample points in a three-dimensional object space, the processing subsystem comprising multiple processors, said method comprising:

dividing said object space into a plurality of regions;

defining a ray passing through said object space such that the ray passes through at least two adjacent regions;

grouping the stored object data values in memory into subsets of data values corresponding to a plurality of sample points contained in the respective region of the object space;

inputting the object data values for each region into an assigned one of said multiple processors;

in each processor, generating an intermediate transparency value T and an intermediate luminescence value S from the object data values for the points along said ray in the region to which the processor is assigned;

grouping said adjacent regions into pairs of regions, each pair including a first region having a first set of intermediate transparency and luminescence values {T(1), S(1)} and a second region having a second set of intermediate transparency and luminescence values {T(2), S(2)}; and, for each said pair of regions, generating a third transparency value T(3) and a third luminescence value S(3) for said ray in said pair of first and second regions from said intermediate transparency values and luminescence values {T(1), S(1)} and {T(2), S(2)} generated for each region in said pair of regions.

2. An apparatus for generating a pixel luminescence value to be displayed by a two-dimensional pixel-type display as part of a view of a three-dimensional image stored as a three-dimensional data array comprising object data values associated with a plurality of sample points in a three-dimensional object space, said apparatus comprising:

means for defining a ray passing through said object space;

a computer memory for storing the three-dimensional data array, including means for dividing said object space into a plurality of regions, each containing multiple sample points, and assigning a subset of the stored data values corresponding to said multiple sample points to each region in the computer memory;

a plurality of first level processing means for generating intermediate transparency and luminescence values from the stored object data values, one said first processing means corresponding to each said region and operative to process the subset of the stored object data values for said region, each said first level processing means comprising means for generating said transparency value from the subset of stored object data values along said ray in said region corresponding to said first level processing means and means for generating said luminescence value from the subset of stored object data values along said ray in said region corresponding to said first level processing means; and a plurality of second level compositing processors, each said second level compositing processor comprising:

means for receiving said intermediate transparency and luminescence values generated by first and second said first level processing means for the first and second regions adjoining along said ray;

means for generating a composite transparency value and a composite luminescence value from said intermediate transparency and luminescence values generated by each of said first and second first level processing means for the first and second regions adjoining along said ray, said composite luminescence value and composite transparency value being substantially the same as the transparency and luminescence values that would be generated by one of said first or second first level processing means for said ray in a region of said object space encompassing both of said first and second regions corresponding to said first and second first level processing means.

3. The apparatus of claim 2 wherein the computer memory further comprises a block of memory coupled to each first processing means for storing the subset of said three-dimensional data array for the region of said object space corresponding to the respective first level processing means.

4. The apparatus of claim 2 wherein each region includes stored object data values for a plurality of data points and said first level processing means further comprises means for storing data specifying a plurality of rays and means for storing data specifying a transparency value and luminescence value corresponding to each said ray.

5. The apparatus of claim 4 wherein each second level compositing processor includes means for processing the data specifying a transparency and luminescence value corresponding to each said ray from the first and second first level processing means to output a composite transparency value and a composite luminescence value for each ray passing through the first and second regions.

6. The apparatus of claim 2 in which:

the object data values stored in the computer memory comprise color and opacity values associated with each of the sample points;

the first level processing means generate the intermediate luminescence and transparency values for each region by computing predetermined functions of the color and opacity values for each point along each ray passing through the region; and the second level compositing processors generate the composite transparency and composite luminescence values from said intermediate transparency and luminescence values for each region along each ray passing therethrough.

7. The apparatus of claim 2 in which the second level compositing processors each comprise a multiplier circuit and an addition circuit arranged to receive the intermediate luminescence and transparency values for the first and second regions and to compute the composite luminescence and transparency values in accordance with the following multiplication and addition relationships:

$$S(3)=S(2)+T(2)*S(1)$$

and $$T(3)=T(1)*T(2),$$

where the intermediate transparency and luminescence values for the first region are denoted as $\{T(1), S(1)\}$ and intermediate transparency and luminescence values for the second region are denoted as $\{T(2), S(2)\}$ and the composite transparency and luminescence values are denoted as $\{T(3), S(3)\}$.

8. The method of claim 1 in which the third luminescence and transparency values are computed for the first and second regions along the ray from the intermediate luminescence and transparency values in accordance with the following multiplication and addition relationships:

$$S(3)=S(2)+T(2)*S(1)$$

and $$T(3)=T(1)*T(2).$$

9. A multiprocessor volume rendering system for generating a two-dimensional pixel-type display of an object from a three-dimensional array of sample point object data wherein the object data for each sample point in the array represents a property of an object to be displayed at a corresponding point in an object space containing the object to be displayed, the system comprising:

a computer memory divided into a plurality of memory spaces, each assigned to store a three-dimensional subset of the object data for a predetermined region (i) of the object space;

controller means for passing a plurality of virtual rays in a predetermined direction through the object space, including first and second regions thereof;

a plurality of first level processors, each coupled to one of the memory spaces to receive the subset of object data assigned thereto;

each first level processor including means operable under control of the controller means for computing a two-dimensional subarray of intermediate transparency and luminescence values $\{S(i), T(i)\}$ for each ray passing through the region (i) from the subset of the object data assigned to the respective first level processor for region (i); and a plurality of second level processors, each containing addition and multiply circuitry arranged to receive and composite the transparency and luminescence values $\{S(i), T(i)\}$ from first and second said first level processors for each ray passing through adjoining first and second regions (i, i+1), to produce a two dimensional view of the object space having a composite transparency and luminescence values representative of a combined transparency and luminescence along each ray through a combination of the first and second regions.

10. A multiprocessor volume rendering system according to claim 9 in which the addition and multiply circuitry in each of the second level processors is arranged compute the composite luminescence and transparency values in accordance with the following relationships:

$$S(3)=S(2)+T(2)*S(1)$$

and $$T(3)=T(1)*T(2),$$

where the intermediate transparency and luminescence values for the first region are denoted as $\{T(1), S(1)\}$ and intermediate transparency and luminescence values for the second region are denoted as $\{T(2), S(2)\}$ and the composite transparency and luminescence values are denoted as $\{T(3), S(3)\}$.

11. A multiprocessor volume rendering system according to claim 9 in which:

the object data for each sample point in the array representing a measured physical property at a corresponding point in an object space includes at least one color value C and an opacity value $\alpha$;

each ray includes a plurality N of points along the ray in each region; and the intermediate transparency and luminescence values are computed by each first level processor for the points along each ray passing through the region assigned to said processor in accordance with the following relationships:

$$S = \sum_{k}^{N} \left[ C_k * \alpha_k * \prod_{j=k+1}^{N} (1-\alpha_j) \right]$$

and $$T = \prod_{j=1}^{N} (1-\alpha_j)$$

where k ranges from 1 to N.

12. A multiprocessor volume rendering system according to claim 9 in which the plurality of second level processors, include a second level processor arranged to receive and composite the transparency and luminescence values $\{S(i), T(i)\}$ from a pair of said second level processors for each ray passing through adjoining pairs of first and second regions (i, i+1), to produce a further composite transparency and luminescence values representative of a combined transparency and luminescence along each ray through a combination of the pairs of first and second regions.

* * * * *